United States Patent [19]

Kato et al.

[11] Patent Number: 5,206,702
[45] Date of Patent: Apr. 27, 1993

[54] TECHNIQUE FOR CANCELING THE EFFECT OF EXTERNAL VIBRATION ON AN ATOMIC FORCE MICROSCOPE

[75] Inventors: Masahiko Kato, Akikawa; Takao Okada, Hachioji; Hiroshi Kajimura, Tokyo, all of Japan

[73] Assignee: Olympus Optical Co., Ltd., Tokyo, Japan

[21] Appl. No.: 592,239

[22] Filed: Oct. 3, 1990

[30] Foreign Application Priority Data

Oct. 9, 1989 [JP] Japan ................................. 1-262061
Oct. 9, 1989 [JP] Japan ................................. 1-262062

[51] Int. Cl.$^5$ ............................................. G01B 9/02
[52] U.S. Cl. ...................................... 356/358; 250/306
[58] Field of Search .................. 356/345, 358, 373; 250/306

[56] References Cited

U.S. PATENT DOCUMENTS

| | | | |
|---|---|---|---|
| 4,668,865 | 5/1987 | Gimzewski et al. | 250/306 |
| 4,724,318 | 2/1988 | Binnig | 250/306 |
| 5,017,010 | 5/1991 | Mamin et al. | 356/358 |

FOREIGN PATENT DOCUMENTS

| | | |
|---|---|---|
| 0262253 | 4/1988 | European Pat. Off. |
| 0290648 | 11/1988 | European Pat. Off. |
| 0090007 | 5/1984 | Japan ................................. 356/373 |

OTHER PUBLICATIONS

Schonenberger et al, "A Differential Interferometer for Force Microscopy", Oct. 1989.
"Atomic Force Microscopy Using Optical Interferometry"; Erlandsson et al, Journal of Vacuum Science Technology, Mar. 1988, pp. 266–270.
Magnetic Imaging By "Force Microscopy" With 1000 A Resolution Y. Martin and H. K. Wickramasinghe; Appl. Phys. Lett. 50(20), May 18, 1987, pp. 1455–1457.
IBM Technical Disclosure Bulletin, vol. 21, No. 2, pp. 416–417, Jul., 1989, Compact Interferometric Atomic Force Sensor.
American Institute of Physics, Oct. 1989, No. 10, pp. 3131–3134, A Differential Interferometer for Force Microscopy.
American Institute of Physics, Jul. 1989, No. 5, pp. 439–440, Scanning Force Microscopy Using A Simple Low-Noise Interferometer.
Physical Review Letters, Mar. 3, 1986, vol. 56, No. 9, pp. 930–933, Atomic Force Microscope.
G. Binnig, C. F. Quate, "Atomic Force Microscope", *Physical Review Letters* vol. 56, No. 9, pp. 930–933 (1986).

*Primary Examiner*—Samuel A. Turner
*Attorney, Agent, or Firm*—Frishauf, Holtz, Goodman & Woodward

[57] ABSTRACT

A light beam from a light source is divided into two beams by a polarized beam splitter. The beam is reflected by a mirror, is converted into a P-polarized beam by a ¼ λ plate, passes through the beam splitter, is reflected by prisms, passes through a polarized beam splitter, is reflected by a mirror, is converted into a S-polarized beam by a ¼ λ plate, is reflected by the beam splitter, and is finally incident on a detector. The beam is converted into a S-polarized beam by a ¼ λ plate, is reflected by a polarized beam splitter, is reflected by the upper face of a cantilever supporting a probe, passes through a polarized beam splitter, is reflected twice in a prism, passes through the beam splitter, is reflected again by the cantilever, is converted into a S-polarized beam by a ¼ λ plate, is reflected by the beam splitter, is converted into a P-polarized beam by a ¼ λ plate, passes through the beam splitter, and is finally incident on the detector. The detector outputs the displacement of the cantilever from the optical path difference of the beams Lr and Lt.

8 Claims, 7 Drawing Sheets

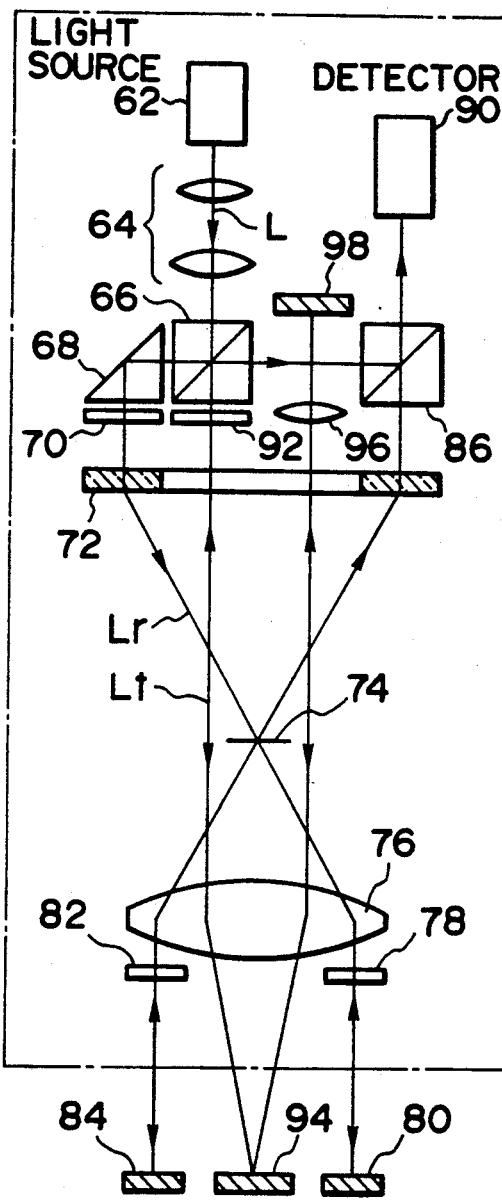
F I G. 2

TECHNIQUE FOR CANCELING THE EFFECT OF EXTERNAL VIBRATION ON AN ATOMIC FORCE MICROSCOPE

BACKGROUND OF THE INVENTION

1. Field of the Invention

The present invention relates to an atomic force microscope (AFM).

2. Description of the Related Art

The atomic force microscope is a microscope which enables observation of the surface profile of a specimen by utilizing an interatomic force. An example of such a microscope is described in G. Binnig, C. F. Quate, "Atomic Force Microscope", *Physical Review Letters* Vol. 56, No. 9, pp 930-933 (1986).

When the pointed tip of a probe supported on a cantilever is brought very close to the surface of a specimen, a very small attracting or repelling force acts between the atoms of the tip and of the surface. As a result of this interatomic force, the cantilever is curved or displaced in accordance with the force which is exerted on the atom of the tip of the probe. The cantilever and/or the specimen are attached to a fine-movement mechanism such as a piezoelectric element, so as to produce relative movement between the probe and the specimen. To observe the specimen, the probe is moved along the surface of the specimen, with the distance between the tip and the surface being maintained at the constant value. More specifically, the displacement of the cantilever is monitored, and the distance between the tip and the surface is subjected to feedback control such that the displacement of the cantilever is maintained at a constant value. With the displacement of the cantilever being maintained at a constant value, the probe is moved, for example, in such a manner as to raster-scan the surface of the specimen. As a result, the tip of the probe moves on a curved plane which is parallel to the surface of the specimen (i.e., which reflects the surface profile of the specimen). During the scanning operation, positional data representing the position of the tip is calculated from the voltage applied to the piezoelectric element, and an image showing the surface profile of the specimen is formed on the basis of the positional data.

The cantilever, which supports the probe thereon, has to be as flexible as possible so that it can be greatly curved or displaced in response to even a very small interatomic force. In addition, the cantilever has to have a high resonance frequency so that its sensitivity to vibration of hundreds of Hz (which may be transmitted to the cantilever from an ordinary construction) can be minimized. In general, the resonance frequency $f_0$ of an elastic member is given by:

$$f_0 = (1/2\pi)\sqrt{k/m_0}$$

where k is an elastic modulus, and $m_0$ is an effective mass of the elastic member.

As may be understood from the above formula, the resonance frequency of the cantilever is determined to be optimum on the basis of the relationship between the sensitivity and external noise. To allow the cantilever both to have a small elastic modulus k (i.e., to become flexible) and to have a high resonating frequency $f_0$, the effective mass $m_0$ of the cantilever has to be reduced to the possible degree. In the art, it is proposed to reduce the effective mass of a cantilever to $10^{-10}$ kg by use of micro fabrication technology. If the effective mass of the cantilever is reduced to this value, a resonance frequency of 2 kHz may be achieved. In reality, however, the proposal has many restrictions.

One method for detecting the displacement of the cantilever utilizes a tunnel current. According to this method, a tunnel current-detecting probe (hereinafter referred to as an STM probe) is brought very close to, but is spaced from the reverse side of the cantilever (the reverse side being opposite to the side on which the probe is supported). A bias voltage is applied between the STM probe and the cantilever, so that a tunnel current which varies in response to the distance therebetween is produced. The tunnel current is constantly measured, and the displacement of the cantilever is detected on the basis of variations in the tunnel current.

Another known method for detecting the displacement of the cantilever is an electrostatic capacitance method. According to the electrostatic capacitance method, a plate capacitor is formed such that its one pole plate is constituted by the reverse side of the cantilever. The displacement of the cantilever is detected by measuring a variation in the electrostatic capacitance.

The displacement of the cantilever caused by an interatomic force is minute; the interatomic force is within the range of $10^{-9}$ through $10^{-12}$ N. This being so, a displacement-detecting system has to be very sensitive to such displacement, and simultaneously should not be adversely affected by external noise. However, the methods noted above are not very reliable against external noise such as vibration, and measurements made by use of them are liable to include an error.

SUMMARY OF THE INVENTION

Accordingly, an object of the present invention is to provide an atomic force microscope which comprises a cantilever reacting sensitively to an interatomic force and which is hardly affected by external noise such as vibration.

An atomic force microscope according to the invention comprises: a probe arranged close to the surface of the sample; a cantilever having one end which supports the probe on one face and has a reflecting surface on the opposite face, the cantilever being elastically deformable in accordance with the magnitude of an interatomic force acting between the atoms of the tip of the probe and a surface portion of the sample; means for moving the probe along the surface of the sample; means for dividing a coherent light beam into two light beams; a reference mirror face formed in a vibration system in which the sample is provided; means for guiding one of the two light beams to the reference mirror face; means for guiding the other light beam to the reflecting surface of the cantilever; means for detecting displacement of the cantilever by synthesizing the light beam reflected by the reference mirror face and the light beam reflected by the reflecting surface of the cantilever with each other, so as to cause interference therebetween; and means for forming an image of the surface profile of the sample on the basis of a signal output from the probe-moving means and a signal output from the detecting means.

Another atomic force microscope of the invention comprises: a probe having a tip arranged close to the surface of the sample; a first cantilever having one end which supports the probe on one face, the first cantilever being elastically deformable in accordance with the magnitude of an interatomic force acting between the atoms of the tip and a surface portion of the sample; means for moving the probe along the surface of the sample; a second cantilever having a characteristic frequency equal to that of the first cantilever and arranged close to the first cantilever; first detecting means for detecting movement of the end of the first cantilever and outputting a signal corresponding to the detected movement; second detecting means for detecting movement of the end of the second cantilever and outputting a signal corresponding to the detected movement; and means for outputting a difference between the signals output from the first and second detecting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a view showing the structure of an atomic force microscope according to the second embodiment of the present invention;

DETAILED DESCRIPTION OF THE PREFERRED EMBODIMENTS

The first embodiment of the present invention will now be described, with reference to FIG. 1 in which only the central beam component of light is indicated, for simplicity.

Figure 1:
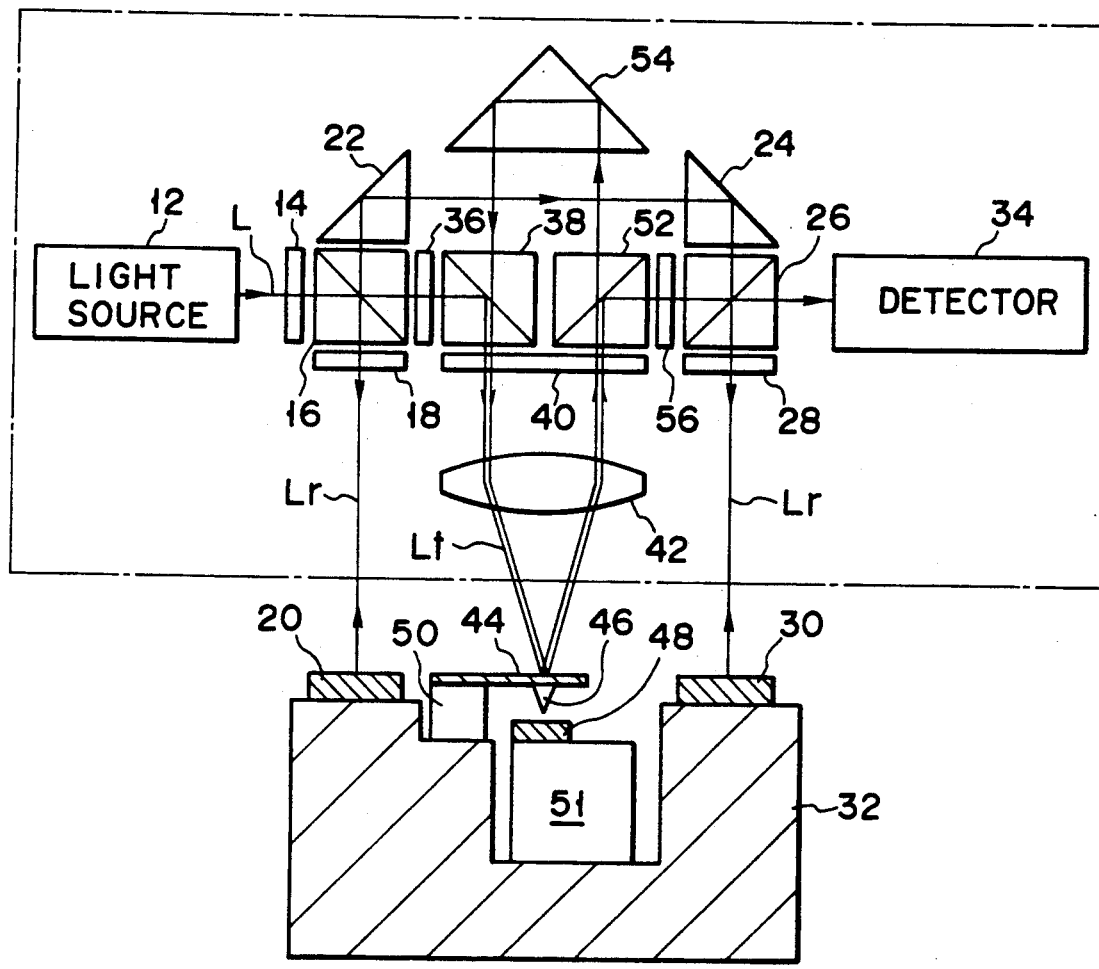
FIG. 1 is a view showing the structure of an atomic force microscope according to the first embodiment of the present invention.

As is shown in FIG. 1, a linearly-polarized light beam L emitted from a light source 12 (e.g., a laser diode) is converted into a circularly-polarized beam by a ¼ wavelength plate 14, and is then incident on a polarized beam splitter 16. On the beam-splitting face of this beam splitter 16, the light beam L is divided into a reference light beam Lr and a test light beam Lt.

The reference light beam Lr is an S-polarized light beam which has been reflected by the beam splitter 16. It is converted into a circularly-polarized beam by a ¼ wavelength plate 18, and then falls on a reference mirror 20. After being reflected by this mirror 20, the reference light beam Lr is converted into a P-polarized beam by the ¼ wavelength plate 18, passes through the beam splitter 16, and is then reflected by a prism 22. The reference light beam Lr reflected by this prism 22 is reflected by another prism 24. After being reflected by the prism 24, the reference light beam Lr passes through both a polarized beam splitter 26 and a ¼ wavelength plate 28. After being converted into a circularly-polarized beam by the ¼ wavelength plate 28, the reference light beam Lr falls on a reference mirror 30. After being reflected by this reference mirror 30, the reference light beam Lr passes through the ¼ wavelength plate 28 by which it is converted into an S-polarized beam. Then, the reference light beam Lr is reflected by the beam splitter 26, and is then incident on an interference fringe-calculating section or a detector 34. The reference mirrors 20 and 30 mentioned above are symmetric with reference to the probe 46 and are arranged in such a manner as to reduce a so-called Abbe's error. In the above, the reference mirrors 20 and 30 are described as being provided independently of each other, but they may be constituted by a single reference mirror annularly formed on an aluminum block 32.

The test light beam Lt is a P-polarized beam which has been transmitted through the beam splitter 16. It is converted into an S-polarized beam by a ¼ wavelength plate 36, is reflected by a polarized beam splitter 38 toward a ¼ wavelength plate 40. After being converted into a circularly-polarized beam by the ¼ wavelength plate 40, the test light beam Lt is deflected and condensed by a lens 42 such that it forms a beam spot on the upper surface of the distal end portion of a cantilever 44. The cantilever 44 has a probe 46 which is attached to the lower face of the distal end portion thereof and which acts on the surface of a specimen 48. The cantilever is fixed to the aluminum block 32, with a piezoelectric member 50 interposed. The upper face of the cantilever 44 is coated with e.g. gold and has a high reflectance. The upper face of the cantilever 44 is substantially at the same level as the reflecting faces of the reference mirrors 20 and 30. The specimen 48 is mounted on an XYZ scanner 51, and can be moved three-dimensionally. The test light Lt falling on the cantilever 44 is reflected thereby, and passes through both the lens 42 and the ¼ wavelength plate 40. After being converted into a P-polarized beam by the ¼ wavelength plate 40, the test light beam Lt passes through a polarized beam splitter 52 and is then incident on a prism 54. After being reflected twice in the prism 54, the test light beam Lt is incident on the polarized beam splitter 38 once again. After passing through the ¼ wavelength plate 40 and the lens 42, the test light beam Lt is reflected by the cantilever 44. The test light beam reflected by the cantilever 44 passes through both the lens 42 and the ¼ wavelength plate 40 and is incident on the polarized beam splitter 52. The test light beam Lt incident on the polarized beam splitter 52 is an S-polarized beam since it passed through the ¼ wavelength plate 40 twice. Therefore, it is reflected by the beam splitter 52. The test light beam reflected by the beam splitter 52 is converted into a P-polarized beam by a ¼ wavelength plate 56, passes through the beam splitter 26, and is incident on the interference fringe-calculating section 34.

The position of the prism 54 is adjusted such that the optical path of the reference light beam Lr and the optical path of the test light beam Lt has the same length when the cantilever is at the normal position, i.e., when the upper faces of the reference mirrors 20 and 30 and the upper face of the cantilever 44 are in the same plane. The interference fringe-calculating section 34 detects the displacement of the cantilever 44 on the basis of interference fringes. More specifically, if the cantilever 44 is displaced, the optical path of the reference light beam Lr and the optical path of the test light beam Lt become different from each other, with the result that interference fringes are produced. The calculating section 34 calculates these interference fringes, for the detection of the displacement of the cantilever 44. The calculating section 34 can be constituted by a known length-measuring interferometer which is of a type capable of detecting the displacement direction on the basis of polarization characteristics. An example of a case where such an interferometer is employed will be described, with reference to FIG. 11.

Figure 11:
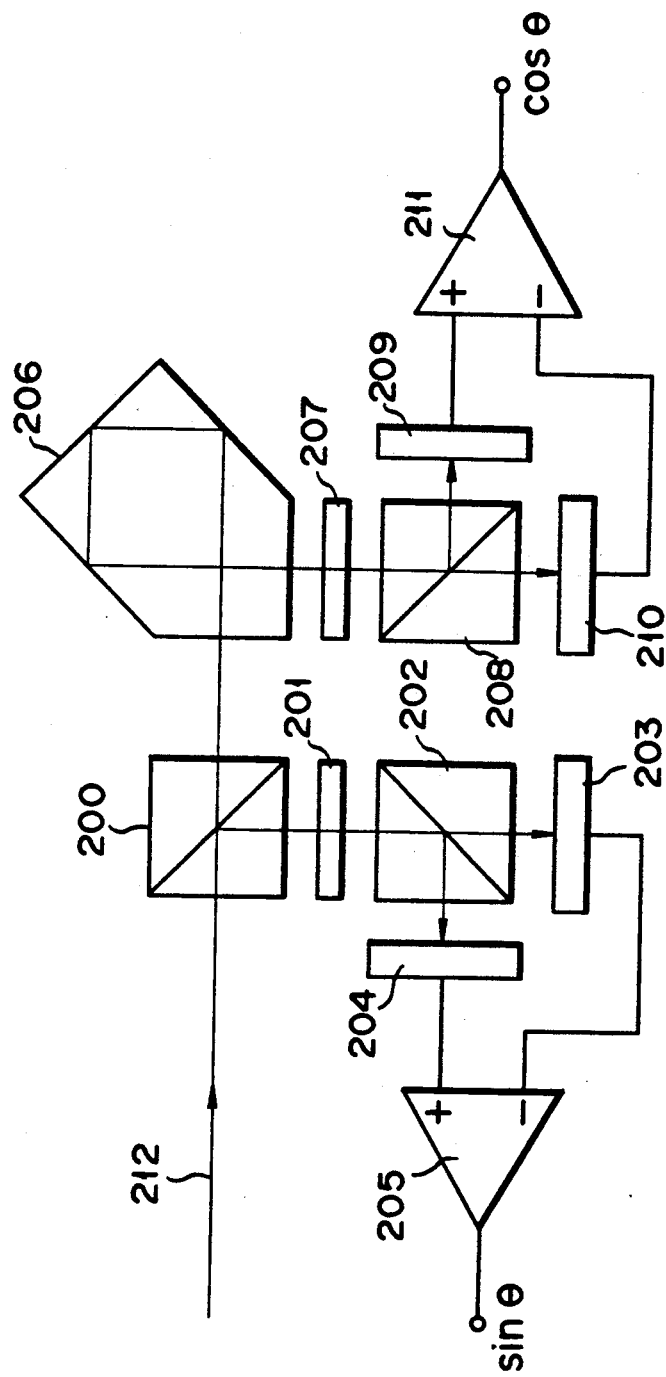
FIG. 11 shows an example of an interference fringe-calculation section shown in FIG. 1.

As is shown in FIG. 11, a light beam 212 obtained by the interference between the reference light beam Lr and the test light beam Lt is divided into two light beams by a beam splitter 200. From one of the two light beams, an interference signal whose phase is shifted by $\pi$ is derived by use of a $\pi/4$ rotator 201, a polarized beam splitter 202, and photodiodes 203 and 204. The interference signal, thus derived, is differentially supplied to an amplifier 205, so as to obtain one (e.g., sin $\theta$) of a pair of two-phase interference signals. The other light beam is totally reflected by the inner faces of a prism 206 such that a phase difference of $\pi/2$ is produced between the perpendicular polarized beam components, and then an interference signal whose phase is shifted by $\pi$ is derived by use of the $\pi/4$ rotator 207, a polarized beam splitter 208, and photodiodes 209 and 210. The interference signal, thus derived, is supplied to an amplifier 211, so as to obtain the other one (e.g., cos $\theta$) of the paired two-phase interference signals. In this way, the signals with which to detect the advancing/retreating direction of the cantilever and which are used for reversible counting are obtained. To improve the resolution, the sin $\theta$ and cos $\theta$ signals are first supplied to a fraction divider in a well-known manner, and are then supplied to a Schmidt trigger circuit and a gate circuit, to thereby obtain a reversible-counting pulse. This reversible-counting pulse is supplied to a counter of a reversible-counting type, which in turn outputs a signal corresponding to the absolute value of displacement.

In the first embodiment mentioned above, the reference mirrors 20 and 30, which are used as a reference in the detection of the displacement of the cantilever 44, are arranged in the same vibration system as the specimen 48. Therefore, measurement can be made in a reliable manner without being adversely affected by external noise, such as vibration. In addition, since the test light beam Lt is reflected twice by the cantilever 44, the sensitivity to displacement doubles.

In the first embodiment, the reference mirrors 20 and 30 are fixed to the aluminum block 32. However, they may be fixed or secured to the XYZ scanner 51, if so desired.

FIG. 2 shows the second embodiment of the present invention. In FIG. 2, only the central beam component of light is indicated, as in FIG. 1.

As is shown in FIG. 2, a coherent light beam L emitted from a light source 62 passes through a beam expander 64 and is then incident on a polarized beam splitter 66. By this polarized beam splitter 66, the light beam L is divided into a reference light beam Lr and a test light beam Lt.

The reference light beam Lr is a light beam which has been reflected by the beam splitter 66. It is reflected by a prism 68 and is then converted into a P-polarized beam by a ¼ wavelength plate 70. Then, the reference light beam Lr is deflected and condensed by a hologram lens 72. This hologram lens 72 has a circular opening in the center, and a lens surface at the periphery. A deflecting film 74 is located at the position corresponding to not only the focal position of the hologram lens 72 but also the focal position of an objective lens 76. After passing through the deflecting film 74, the reference light beam Lr is incident on the objective lens 76. By this objective lens 76, the reference light beam Lr is refracted and collimated. Then, the reference light beam Lr passes through a ¼ wavelength plate 78 and is incident on a reference mirror 80. The reference light beam Lr reflected by the reference mirror 80 passes through the ¼ wavelength plate 78 once again, so that it is converted into an S-polarized beam. Then, it is refracted by the objective lens 76 and is converged on the deflecting film 74. The reference light beam Lr, which is then a P-polarized beam, passes through the deflecting film 74 and reaches the hologram lens 72. By this hologram lens 72, the reference light beam Lr is refracted and collimated. Then, the reference light beam Lr passes through a polarized beam splitter 86 and is incident on an interference fringe-calculating section or a detector 90.

The test light beam Lt passing through the beam splitter 66 is converted into a circularly-polarized beam by a ¼ wavelength plate 92, is refracted and converged by the objective lens 76, and is then incident on the upper face of a cantilever 94. Although not shown, the cantilever 94 has a probe used for detecting an interatomic force. As in the first embodiment, the upper face of the cantilever 94 has a high reflectance and reflects the test light beam Lt incident thereon. The test light beam Lt reflected by the cantilever 94 is refracted and collimated by the objective lens 76, and is then incident on a lens 96. By this lens 96, the test light beam Lt is converged on a reflector 98. After being reflected by the reflector 98 at a high reflectance, the test light beam Lt passes through the lens 96 and returns to the cantilever 94. After being reflected again by the cantilever 94, the test light beam Lt is collimated by the objective lens 96 and is incident on the ¼ wavelength plate 92. By this ¼ wavelength plate 92, the test light beam is converted into an S-polarized beam. Thereafter, the test light beam Lt is reflected by the two beam splitters 66 and 86, and is then incident on the interference fringe-calculating section 90. In this interference fringe-calculating section 90, the displacement of the cantilever 94 caused by an interatomic force is detected on the basis of interference fringes arising from an optical path difference between the reference light beam Lr and the test light beam Lt.

In the second embodiment mentioned above, the cantilever 94 is very close to the reference mirrors 80 and 84, in comparison with the first embodiment.

Therefore, measurement can be made in a more reliable manner without being adversely affected by vibration.

Figure 3A:
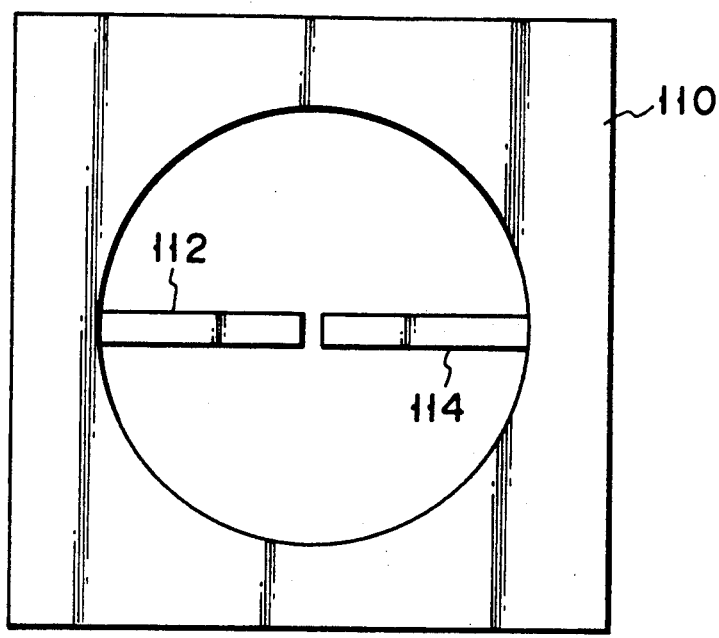
FIGS. 3A and 3B are plan and sectional views, respectively, of one type of cantilever employed in an atomic force microscope according to the third embodiment of the present invention.
Figure 3B:
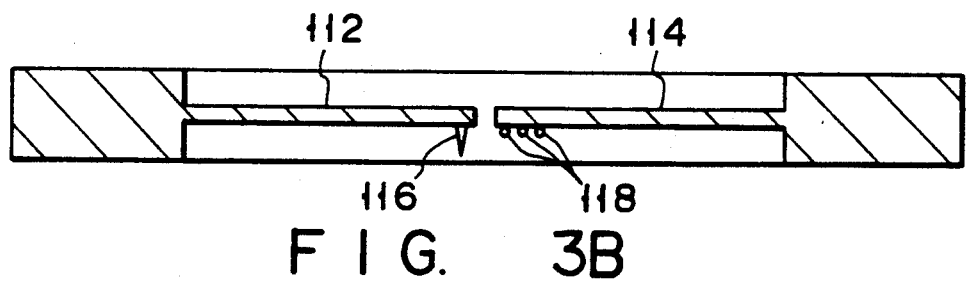

The third embodiment of the present invention will be described. The plan and sectional views of the cantilevers used in this embodiment are shown in FIGS. 3A and 3B, respectively. As is shown in FIGS. 3A and 3B, a substrate 110 has a circular opening, and a pair of cantilevers 112 and 114 extend from the opposing circumferential portions of the opening such that their free ends are located close to each other. The two cantilevers 112 and 114 have the same width, thickness and length. The elastic modulus k of each cantilever is given by the following formula:

$$k = Eab^3/4l^3$$

where E is a Young's modulus, and a, b and l are the width, thickness and length of the cantilever, respectively.

In order to improve the sensitivity to the displacement of a cantilever, the value of the k has to be decreased. Therefore, the value of l (length) should be increased, while the value of b (thickness) should be decreased. For example, the dimensions of each cantilever are determined as follows in the embodiment: $a = 2,000$ μm, $b = 10$ μm, and $l = 2$ to 3 mm.

To detect an interatomic force, the first cantilever 112 is provided with a probe 116 on the lower face of the distal end (i.e., the free end) thereof. The probe 116 is formed by first overlaying the first cantilever 112 with a lithography mask pattern having an opening of predetermined size and then carrying out the deposition of tungsten until the opening of the lithography mask pattern is filled with the deposited tungsten. The second cantilever 114 is provided with a dummy weight 118 on the lower face of the distal end thereof. The effective mass of this dummy weight 118 is equal to that of the probe 116. The dummy weight 118 is formed simultaneous with the probe 116. Specifically, a plurality of openings which are smaller than the probe-formation opening are formed, and the deposition of tungsten is carried out until the total amount of tungsten deposited through the openings becomes corresponds to the effective mass of the probe 116.

Figure 4:
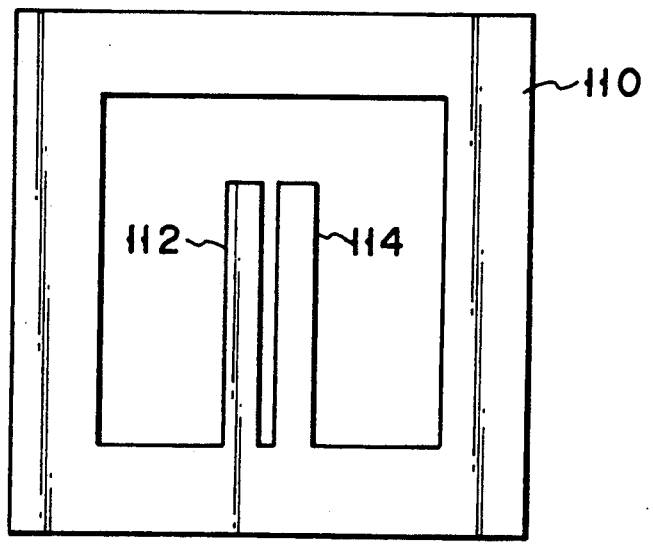
FIG. 4 is a plan view of another type of cantilever.

The cantilevers used in the third embodiment are not limited to those shown in FIGS. 3A and 3B. Cantilevers of other types may be employed as long as they have the same characteristic frequency and their distal ends ar located close to each other. For example, the cantilevers which are of the type shown in FIG. 4 may be employed, in place of those shown in FIGS. 3A and 3B. In the type shown in FIG. 4, a substrate 110 has a rectangular opening, and a pair of cantilevers 112 and 114 extend in parallel to each other from one side of the rectangular opening.

Figure 5:
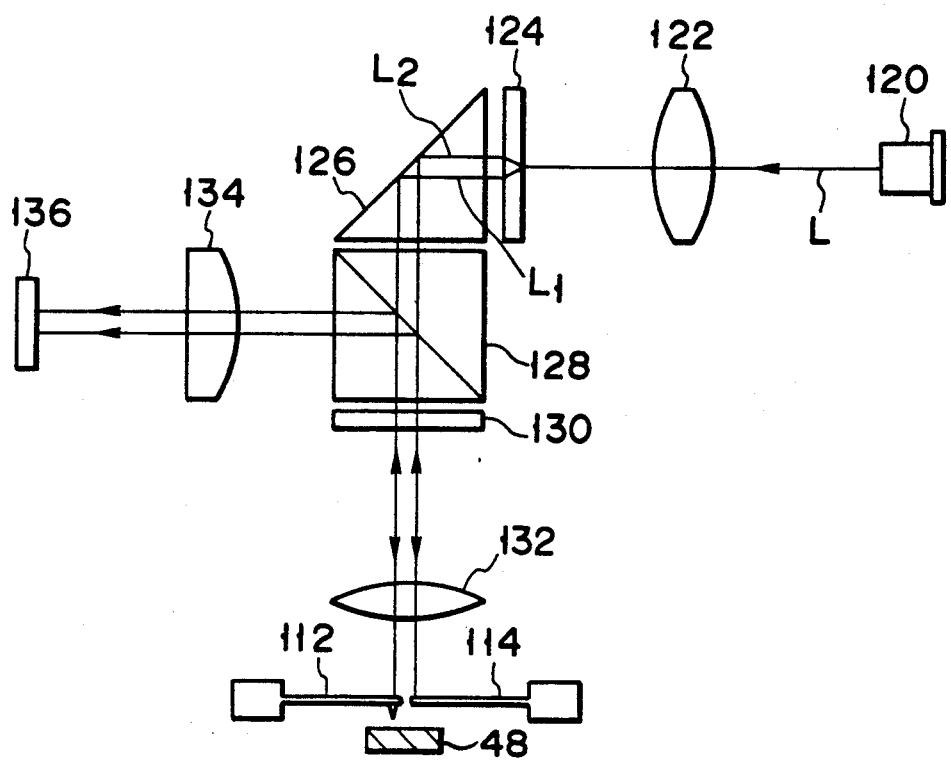
FIG. 5 shows the structure of a system which detects the displacement of the cantilever.
Figure 6:
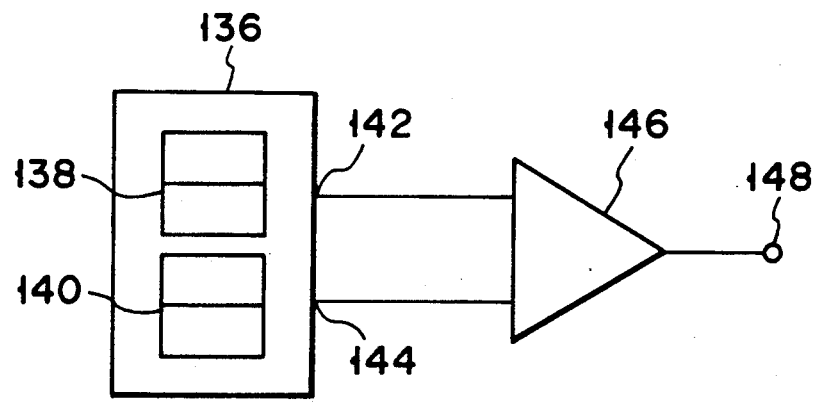
FIG. 6 shows a circuit arrangement used for removing external noise.

Next, a system used for detecting the displacement of a cantilever will be described, with reference to FIG. 5. In FIG. 5, only the central beam component of light is indicated, for simplicity. Referring to FIG. 5, a laser diode (LD) 120 emits a polarized light beam L whose plane of polarization is perpendicular to the drawing sheet of FIG. 5. The light beam L is collimated by a collimator lens 122, and is then incident on a diffraction grating 124 whose grating direction is perpendicular to the drawing sheet of FIG. 5. The diffraction grating 124 divides the light beam L into two light beams L1 and L2. These light beams L1 and L2 are reflected downward by a prism 126, pass through both a polarized beam splitter 128 and a ¼ wavelength plate 130, and are then condensed by an objective lens 132 such that each of them has a cross section of 3 μm or so. The light beams L1 and L2 are directed to the distal ends of the cantilevers 112 and 114, respectively, while simultaneously maintaining a distance of approximately 20 μm with reference to each other. After being reflected by the upper faces of the respective cantilevers, the light beams L1 and L2 pass through both the objective lens 132 and the ¼ wavelength plate 130, and are then incident on the beam splitter 128. Since the light beams L1 and L2 are made to pass through the ¼ wavelength plate 130 twice, their polarization direction is rotated 90°, so that they become polarized light beams whose planes of polarization are parallel to the drawing sheet. Therefore, the light beams L1 and L2 are reflected by the beam splitter 128. The light beams L1 and L2 reflected by the beam splitter 128 are condensed by a lens 134, and are then incident on a photodetector 136. As is shown in FIG. 6, this photodetector 136 includes two photodiodes 138 and 140 each of which is made up of two segments. The photodetector 136 has two output terminals 142 and 144. From output terminal 142, a signal corresponding to the position of the first cantilever 112 is output. From output terminal 144, a signal corresponding to the position of the second cantilever 114 is output. Since the first cantilever 112 moves in response to both an interatomic force and external noise, the signal produced from output terminal 142 reflects both of them. Since the second cantilever 114 moves in response to the external noise alone, the signal produced from output terminal 144 reflects the external noise alone. These signals are supplied to a differential amplifier 146, where they are subtracted from each other. Thus, a signal produced from output terminal 148 does not include a component corresponding to the external noise, so that it accurately represents that movement of the cantilever 112 that is caused by the interatomic force alone.

Figure 7:
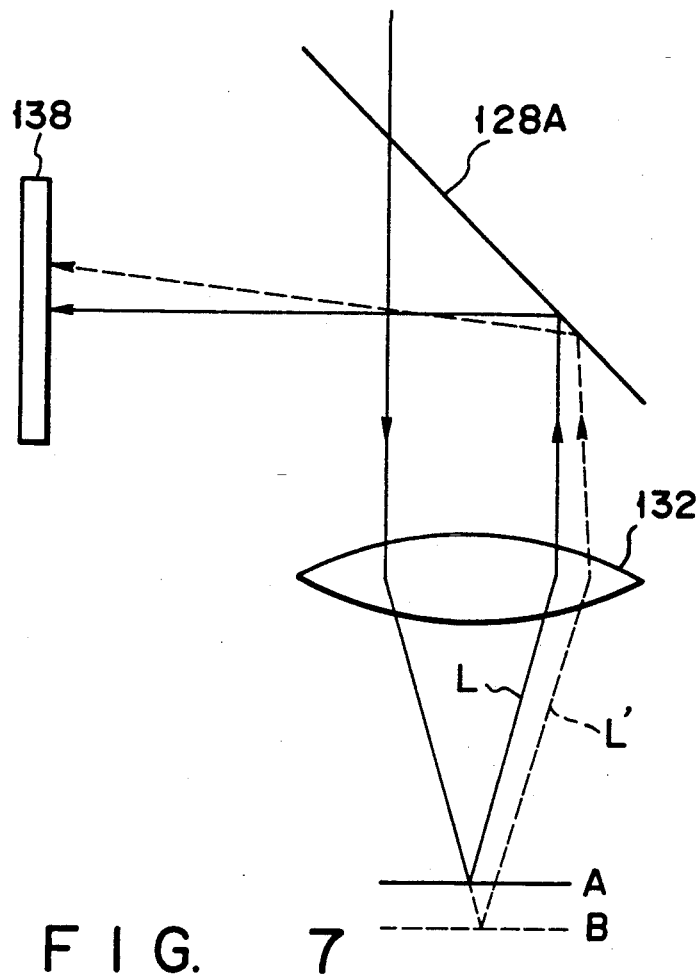
FIG. 7 illustrates the principles underlying the detection of the displacement of the cantilever.
Figure 8:
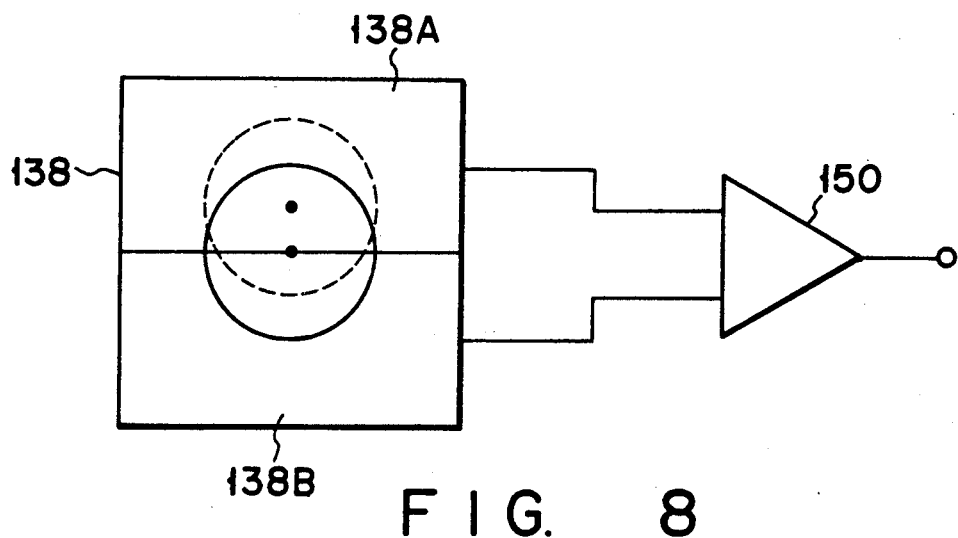
FIG. 8 shows the structure of a displacement-detecting section of one type.

Next, a description will be given, with reference to FIGS. 7 and 8, as to how the vertical movement of the cantilevers 112 and 114 is detected. The displacement-detecting system for cantilever 112 and the displacement-detecting system for cantilever 114 are similar to each other, so that the system for cantilever 112 will be taken by way of example in the descriptions below. When the upper face of the cantilever 112 is at the focal position A of the objective lens 132, the light beam L reflected by the cantilever 112 is reflected by the beam-splitting face 128A of the beam splitter 128 and is incident on the two-segment photodiode 138 of the photodetector 136, while passing through the optical path indicated by the solid lines in FIG. 7. As is indicated by the solid-line circle in FIG. 8, the center of the light beam incident on the photodiode 138 is at the boundary between the two segments 138A and 138B of the photodiode 138. In contrast, when the upper face of the cantilever 112 is at the position B which is shifted from the focal position A of the objective lens 132, the light beam L' reflected by the cantilever 112 is incident on the photodiode 138 while passing through the optical path indicated by the broken lines in FIG. 7. As is indicated by the broken-line circle in FIG. 8, the center of the light beam incident on the photodiode 138 is located on the side of the segment 138A of the photodiode 138. Therefore, the movement of the cantilever can be detected by supplying a differential amplifier 150 with signals corresponding to the two segments 138A and 138B.

Figure 9:
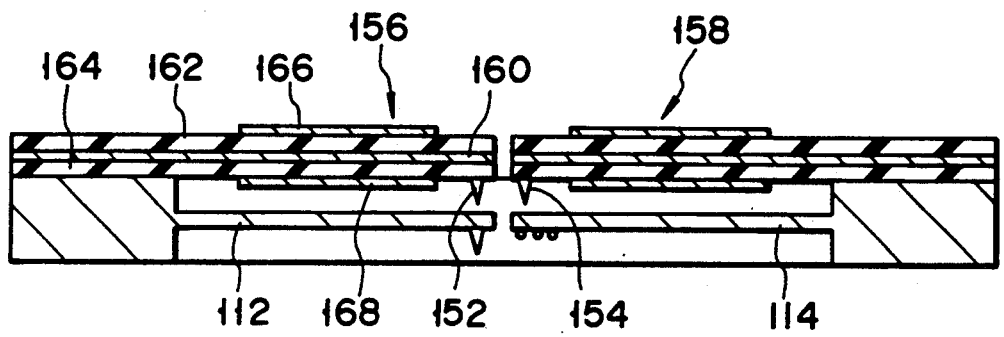
FIG. 9 shows the structure of a displacement-detecting section of another type.
Figure 10:
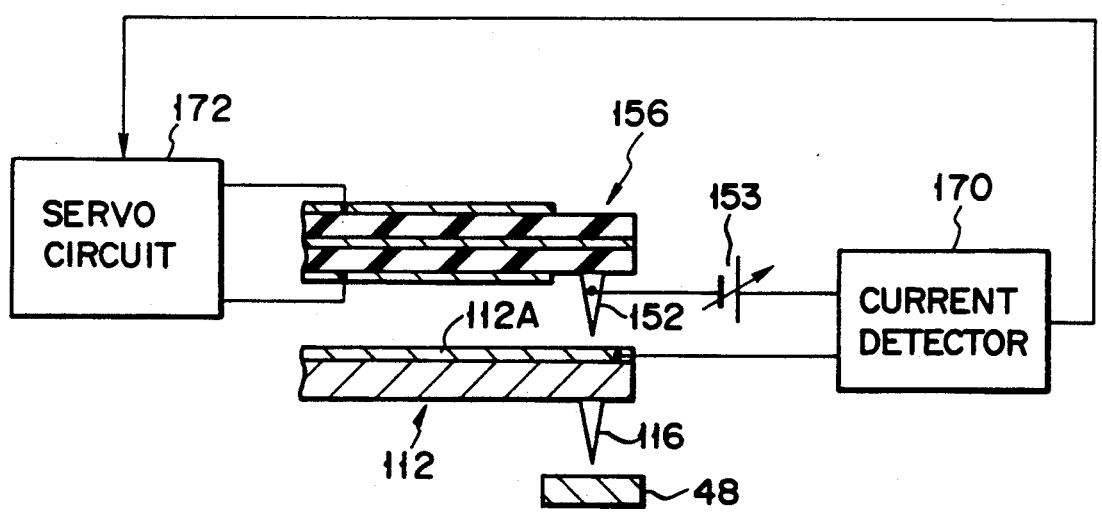
FIG. 10 illustrates how the displacement-detecting section shown in FIG. 9 operates.

Another example of a cantilever displacement-detecting system is shown in FIGS. 9 and 10. This detecting system detects the movement of the cantilevers 112 and 114 by utilization of a tunnel current. In this displacement-detecting system, probes 152 and 154, each of which is adapted to detect a tunnel current, are located above the distal ends of the cantilevers 112 and 114, respectively. The probes 152 and 154 are supported on the lower faces of cantilevers 156 and 158, respectively, which are fixed to circumferential portions of a circular opening formed in a substrate 110. Since the two cantilevers 156 and 158 have a similar structure, only cantilever 156 will be explained by way of example. The cantilever 156 is of a so-called bimorph type and is made up of: a common electrode 160; a ZnO piezoelectric layer 162 stacked on the upper side of the common electrode 160; a ZnO piezoelectric layer 164 stacked on the lower side of the common electrode 160; a piezoelectric layer-driving electrode 166 stacked on the upper side of the ZnO piezoelectric layer 162; and a piezoelectric layer-driving electrode 168 stacked on the lower side of the ZnO piezoelectric layer 164. The cantilever 156 ma be thicker and shorter than the cantilever 112 employed in the AFM system, but the position at which the probe 152 is attached to the cantilever 156 should be determined carefully.

The displacement of the cantilever 112 is detected in the manner shown in FIG. 10, for example. As is shown in FIG. 10, a predetermined voltage is applied between the probe 152 and a conductive layer 112A formed on the upper face of the cantilever 112. A tunnel current flowing between the probe 152 and the conductive layer 112A is detected by use of a current detector 170. Simultaneously, the cantilever 156 is driven in such a manner as to maintain the tunnel current at a constant value by applying a servo voltage to the cantilever 156 from a servo circuit 172. The displacement of the cantilever 112 is detected on the basis of the servo voltage applied by the servo circuit 172. In the case where the cantilever 122 is formed of a conductive material, the conductive layer 112A mentioned above need not be formed. In this case, the cantilever 112 itself functions as a conductive layer as well.

As described above, the atomic force microscope of the third embodiment employs a pair of cantilevers which have the same characteristic frequency and the free ends of which are located close to each other. Since data representing an interatomic force is derived from the movement difference between the two cantilevers, the cantilevers can be formed of a flexible material, without being adversely affected by external noise, such as vibration. Accordingly, the interatomic force can be detected with high sensitivity. Moreover, if an STM system is used for detecting the displacement of the cantilevers, the detection can be performed without being adversely affected by an interatomic force exerted on the probe of the STM or noise included in the STM system itself. Accordingly, the measuring accuracy can be remarkably improved in comparison with that of an AFM apparatus which is used in a conventional STM system and an AFM displacement-detecting system.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An atomic force microscope for evaluating the surface of a sample, comprising:
   a probe having a tip arranged close to the surface of the sample;
   a cantilever having one end which supports the probe on one face thereof and has a reflecting surface on the opposite face, said cantilever being elastically deformable in accordance with the magnitude of an interatomic force acting between the atoms of the tip of the probe and a surface portion of the sample;
   means for moving the probe along the surface of the sample;
   a light source for emitting a coherent light beam;
   means for dividing said coherent light beam into two light beams;
   a first support to which the sample is mounted and a second support to which is secured another end of said cantilever opposite to said one end thereof;
   a reference mirror face coupled to one of said first and second supports so as to vibrate with a corresponding one of the reflecting surface of the cantilever and the surface of the sample as part of the same vibration system;
   means for guiding one of said two light beams to said reference mirror face;
   means for guiding the other of said two light beams to the reflecting surface of said cantilever;
   means for detecting displacement of said cantilever by synthesizing the light beam reflected by the reference mirror face and the light beam reflected by the reflecting surface of the cantilever with each other, so as to cause interference therebetween; and
   means for forming an image of the surface profile of the sample on the basis of a signal output from the probe-moving means and a signal output from the detecting means.

2. An atomic force microscope for evaluating the surface of a sample, comprising:
   a probe having a tip arranged close to the surface of the sample;
   a first cantilever having one end which supports the probe on one face, said first cantilever being elastically deformable due to external vibration and also in accordance with the magnitude of an interatomic force acting between the atoms of the tip and a surface portion of the sample;
   means for moving the probe along the surface of the sample;
   a second cantilever being elastically deformable due to said external vibration but not due to said interatomic force and having a characteristic frequency equal to that of the first cantilever, said second cantilever being arranged close to the first cantilever;
   first detecting means for detecting movement of said one free end of the first cantilever and outputting a signal corresponding to the detected movement;
   second detecting means for detecting movement of a free end of the second cantilever and outputting a signal corresponding to the detected movement; and means for outputting a difference between the signals output from the first and second detecting means.

3. An atomic force microscope according to claim 2, wherein at least one of said first and second detecting means includes:
- a conductive film formed on that face of the cantilever which is opposite to the face facing the sample;
- a tunnel tip supported at a position close to the conductive film;
- means for applying a bias voltage between the conductive film and the tunnel tip, to thereby cause a tunnel current therebetween; and
- means for detecting the tunnel current, the detecting means detecting the movement of the cantilever on the basis of a variation in the tunnel current.

4. An atomic force microscope according to claim 3, wherein said at least one detecting means further includes:
- means for supporting the tunnel tip such that the tunnel tip is moved closer to or away from the conductive film; and
- servo means for controlling the tunnel tip-supporting means on the basis of the variation in the tunnel current such that the distance between the tunnel tip and the conductive film is maintained at a constant value.

5. An atomic force microscope according to claim 2, wherein at least one of said first and second detecting means includes:
- a reflector formed on that face of the cantilever which is opposite to the face facing the sample; and
- an optical system for guiding light to the reflector and receiving the light reflected by the reflector, to detect the movement of the cantilever.

6. An atomic force microscope according to claim 5, wherein:
- said reflector receives light incident thereon slantwise; and
- said optical system includes: a two-segment type photodiode on which the light reflected by the reflector is incident; and a comparator for outputting a signal which corresponds to a difference between light received by one of two segments of the photodiode and light received by the other segment of the photodiode and which therefore represents the displacement of the cantilever.

7. An atomic force microscope comprising:
- a probe having a tip arranged close to a surface of a sample;
- a cantilever supporting a probe on one face thereof at a free end and having a detection surface on the opposite face at the free end, said cantilever being elastically deformable in accordance with the magnitude of an interatomic force acting between the atoms of the tip of the probe and a surface portion of the sample so as to move the detection surface;
- means for scanning the probe along the surface of the sample;
- a first support to which the sample is mounted and a second support to which is secured another end of said cantilever opposite to said free end thereof;
- a reference mirror face coupled to one of said first and second supports so as to vibrate with a corresponding one of the reflecting surface of the cantilever and the surface of the sample as part of the same vibration system;
- first detection means for detecting displacement of the detection surface;
- second detection means for detecting displacement of the reference mirror face caused by an external vibration; and
- interatomic force detection means for detecting an interatomic force acting between the atoms of the tip of the probe and the surface portion of the sample by comparing outputs from the first and second detection means with each other.

8. An atomic force microscope for evaluating the surface of a sample, comprising:
- a probe having a tip arranged close to the surface of the sample;
- a cantilever having a free end which supports the probe on one face thereof and has a reflecting surface on the opposite face, said cantilever being elastically deformable in accordance with the magnitude of an interatomic force acting between the atoms of the tip of the probe and a surface portion of the sample;
- means for moving the probe along the surface of the sample;
- a light source having means for emitting a coherent light beam;
- means for dividing the coherent light beam into two light beams;
- a first support to which the sample is mounted and a second support to which is secured another end of said cantilever opposite to said free end thereof;
- a reference mirror face coupled to one of said first and second supports so as to vibrate with a corresponding one of the reflecting surface of the cantilever and the surface of the sample as part of the same vibration system;
- means for guiding one of said two light beams to the reference mirror face;
- means for guiding the other of said two light beams to the reflecting surface of said cantilever;
- means for detecting displacement of said cantilever by comparing the light beam reflected by the reference mirror face and the light beam reflected by the reflecting surface of the cantilever with each other; and
- means for forming an image of the surface profile of the sample of the basis of a signal output from the probe-moving means and a signal output from the detecting means.

* * * * *